(12) United States Patent
Wunderwald (10) Patent No.: US 10,775,621 B2
(45) Date of Patent: Sep. 15, 2020

(54) METHOD, DEVICE AND COMPUTER-READABLE STORAGE MEDIUM WITH INSTRUCTIONS FOR SETTING A HEAD-UP DISPLAY IN A TRANSPORTATION VEHICLE

(71) Applicant: VOLKSWAGEN AKTIENGESELLSCHAFT, Wolfsburg (DE)

(72) Inventor: Tim Wunderwald, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/561,463

(22) Filed: Sep. 5, 2019

(65) Prior Publication Data

US 2020/0082570 A1    Mar. 12, 2020

(30) Foreign Application Priority Data

Sep. 6, 2018   (DE) ........................ 10 2018 215 185

(51) Int. Cl.
| | |
|---|---|
| *G02B 27/01* | (2006.01) |
| *B60K 35/00* | (2006.01) |
| *B60R 1/00* | (2006.01) |
| *G06T 7/80* | (2017.01) |

(52) U.S. Cl.
CPC .......... *G02B 27/0101* (2013.01); *B60K 35/00* (2013.01); *B60R 1/00* (2013.01);
(Continued)

(58) Field of Classification Search
CPC ....... G02B 27/01–0149; G02B 27/0179–0189; G02B 2027/0105–0169;
(Continued)

(56) References Cited

U.S. PATENT DOCUMENTS 9,430,046 B2 *   8/2016   Steers ..................... G06F 3/017
9,794,552 B1 *  10/2017   Ribble ................. H04N 17/002
(Continued)

FOREIGN PATENT DOCUMENTS

| DE | 102005037797 A1 | 2/2007 |
|---|---|---|
| DE | 102007045301 A1 | 4/2009 |

(Continued)

*Primary Examiner* — Gene W Lee
(74) *Attorney, Agent, or Firm* — Barnes & Thornburg LLP (57) ABSTRACT

A method, a device and a computer-readable storage medium containing instructions for setting a head-up display in a transportation vehicle. A setting device is introduced into a defined position in the transportation vehicle. The setting device has at least one camera and one projection unit. The projection unit is used to project an alignment pattern onto a calibration target positioned outside the transportation vehicle. The calibration target and the alignment pattern are acquired using a calibrated camera installed in the transportation vehicle. A deviation of the setting device from the defined position in the transportation vehicle is determined based on the image data of the calibrated camera. At least one test image displayed by the head-up display is acquired using the camera of the setting device. Setting information for the head-up display is determined based on the at least one acquired test image.

20 Claims, 7 Drawing Sheets

(52) U.S. Cl.
CPC ........ *G06T 7/80* (2017.01); *B60K 2370/1529* (2019.05); *B60K 2370/777* (2019.05); *B60R 2300/205* (2013.01); *G02B 2027/0198* (2013.01)

(58) Field of Classification Search
CPC ....... G02B 2027/0181–0198; B60K 2370/152; B60K 2370/1529; B60R 2300/205
See application file for complete search history.

(56) References Cited

U.S. PATENT DOCUMENTS

| | | | | |
|---|---|---|---|---|
| 2009/0033926 | A1* | 2/2009 | Haug | ........................ G06T 7/80 356/243.1 |
| 2015/0168719 | A1 | 6/2015 | Kim | |
| 2018/0160087 | A1* | 6/2018 | Nill | ........................ G02B 27/01 |
| 2018/0239134 | A1* | 8/2018 | Franz | ...................... G03B 21/62 |
| 2019/0205662 | A1* | 7/2019 | Samal | ........................ B60R 1/00 |
| 2019/0278094 | A1* | 9/2019 | Huang | ............... G02B 27/0093 |

FOREIGN PATENT DOCUMENTS

| | | |
|---|---|---|
| DE | 102010040694 A1 | 3/2012 |
| DE | 102011075702 A1 | 11/2012 |
| DE | 102012010120 A1 | 11/2013 |
| DE | 102014001376 B3 | 1/2015 |
| DE | 102014013221 A1 | 4/2015 |
| DE | 102014019013 A1 | 6/2015 |
| DE | 102015006284 A1 | 2/2016 |
| DE | 102015008887 A1 | 3/2016 |
| EP | 3444584 A1 | 2/2019 |

\* cited by examiner

METHOD, DEVICE AND COMPUTER-READABLE STORAGE MEDIUM WITH INSTRUCTIONS FOR SETTING A HEAD-UP DISPLAY IN A TRANSPORTATION VEHICLE

PRIORITY CLAIM

This patent application claims priority to German Patent Application No. 10 2018 215 185.7, filed 6 Sep. 2018, the disclosure of which is incorporated herein by reference in its entirety.

SUMMARY

Illustrative embodiments relate to a method, a device and a computer-readable storage medium containing instructions for setting a head-up display in a transportation vehicle. Illustrative embodiments further relate to a setting device for use in such a method or with such a device.

BRIEF DESCRIPTION OF THE DRAWINGS

Disclosed embodiments will be explained in more detail below in connection with the figures, in which.

DETAILED DESCRIPTION

Vehicle navigation will in the future make increasing use of displays in a head-up display (HUD). In this context, the light beams of a display installed in the dashboard are deflected by a plurality of mirrors and lenses and mirrored into the eye of the driver via a projection surface, such that the driver perceives a virtual image outside the transportation vehicle. The front windscreen, whose curved shape has to be taken into account in the display, often serves as projection surface in the automotive sector. As an alternative, an additional pane of glass or plastic, which is arranged between the driver and the front windscreen on the dashboard, is sometimes also used. By virtue of the optical overlaying of the display and the driving scene, fewer head and eye movements are required to read the information. Adaptation effort for the eyes is additionally reduced, since it is necessary to accommodate to a lesser extent, as far as even not at all, depending on the virtual distance of the display. Current-series HUDs are however limited to displays directly below the primary field of view of the driver. Although this display technology reduces instances of looking away from the road, it however still has the drawback that the information that is presented has to be interpreted and transferred to the real situation, since it is not recorded in the real scene. In complex situations, this may constitute a mentally demanding cognitive process.

With the constant further development of virtual reality and augmented reality technologies and applications, these are also finding their way into cars, in particular, for the displays of head-up displays. Augmented reality (AR) is the enrichment of the real world by virtual elements that are recorded in a positionally correct manner in three-dimensional space and allow real-time interaction. "Augmented reality" has become the prevalent expression used by experts in the field when referring to this type of technology. The expression "mixed reality" is also used synonymously.

By marking objects and incorporating information at their real reference position, that is to say by way of a contact-analogous display, surroundings-related information is able to be displayed directly in the field of view of the driver. This direct graphical enrichment of the surroundings, such as augmented reality, may considerably reduce cognitive transfer requirements. Augmented reality offers many application possibilities for assisting the driver by way of contact-analogous marking of roadways and objects, in particular, for transportation vehicle navigation.

So that the functionality of a head-up display, that is to say the display of driving information on the front windscreen, is perceived as being correct by the client, the installation of head-up displays requires calibration during transportation vehicle production due to the tolerances that arise. The tolerances occur due to the structure of the head-up display module, that is to say of the projector that projects the image to be displayed onto the front windscreen via a plurality of deflection mirrors, the installation of the module in the cockpit and due to the structure and the installation of the front windscreen. If augmented reality displays are used, the permissible tolerances are even stricter. In this case, in addition to the calibration, that is to say the software-based compensation of the tolerances by offsets in the associated controller, it is also necessary to adjust the installation position of the module relative to the front windscreen.

In this connection, DE 10 2005 037 797 B4 describes a system for calibrating a projection of a head-up display that is able to be used, in a manner able to be automated, in the production of a transportation vehicle or in retrofitting. A projection device generates a calibration pattern on a projection surface that is recorded by a camera device. The projection device and the camera device are driven by a control unit. The system additionally comprises a way for automatically calibrating the projection, and a positioning method or mechanism, able to be driven by the control unit, for the camera device. Depending on the signals, acquired by the camera device, of the calibration pattern, the control unit drives the method or mechanism for automatically setting the calibration such that a predetermined target function, in particular, keeping the projection free from distortion, is met. The projection may also take place onto a calibration target.

DE 10 2012 010 120 A1 describes a method for calibrating a head-up display in a transportation vehicle. In the method, a camera is positioned in a defined position in the transportation vehicle. The head-up display then projects a test image onto a windscreen pane of the transportation vehicle. The camera is positioned such that at least one edge region of an eyebox is recorded by the camera.

DE 10 2014 013 221 A1 describes a device for calibrating an image display unit of a transportation vehicle. The device comprises a projection unit belonging to the image display unit and that projects images onto a projection screen in a field of view of a transportation vehicle occupant and onto a headrest arranged on a transportation vehicle seat. By way of the projection unit, a test pattern is projected directly onto a surface of the headrest and acquired by an acquisition unit. To project the test pattern, the projection unit may comprise a dedicated laser. The acquired test pattern is compared with a setpoint pattern by way of an evaluation unit. An interior camera may be used as acquisition unit.

As it stands, the calibration generally takes place on a testing bay for driver assistance systems at the end of the production line. After the transportation vehicle has been aligned in the testing bay, a camera is brought, on the testing bay, by way of a mechanically movable telescopic arm, to the most likely eye position of the driver, that is to say the middle of what is known as the eyebox. This position is predefined using a simulated ideal transportation vehicle. Any deviations of the real transportation vehicle in terms of the position in the testing bay and in space are determined by laser sensors by acquiring the wheel arch edges and taken into account when positioning the camera. Various test images are then displayed, using which firstly the position of the displayed image and secondly the distortion and image errors in the display are determined. This information is then written to the corresponding controller, which thereupon takes these deviations into account when displaying the driving information.

However, the fluctuations in the structure of the wheel arch edges are large, as a result of which errors may arise even in the positioning. At the same time, these points are the only contours able to be measured externally that are able to be acquired by lasers and compared with the simulation.

To circumvent the tolerances when positioning the camera, the adjustment and calibration may take place as early as in the assembly line. In this case, a telescopic arm with a camera is introduced into the transportation vehicle by way of a manipulator. This manipulator may rest on holes of a reference point system in the base when the seats are not yet installed and then position the camera in the middle of the eyebox. Screwdrivers then move automatically to the setting screws of the module. The displayed test images are then evaluated using the camera and the screwdrivers are appropriately driven so as to bring the image into an optimum position. Small distortions in the image are then compensated by way of a calibration.

However, this process is also not reliable in terms of production, since the fluctuations on the assembly line may lead to errors in the image recording. This may in turn make the evaluation impossible.

Furthermore, neither solution has a sufficient customer service solution. At present, the image is brought into a plausible position by a customer service representative using a sun visor having a slot. Image errors or distortions are not taken into account in this case. The high requirements in terms of the accuracy for augmented reality displays are also able to be met only with difficulty using these methods.

Disclosed embodiments provide an improved concept for setting a head-up display in a transportation vehicle.

This is achieved by a method, a device, a computer-readable storage medium containing instructions and a setting device.

According to a first disclosed embodiment, a method for setting a head-up display in a transportation vehicle comprises introducing a setting device into a defined position in the transportation vehicle, wherein the setting device has at least one camera and one projection unit; projecting an alignment pattern using the projection unit onto a calibration target positioned outside the transportation vehicle; acquiring the calibration target and the alignment pattern using a calibrated camera installed in the transportation vehicle; determining a deviation of the setting device from the defined position in the transportation vehicle on the basis of the image data of the calibrated camera; acquiring at least one test image displayed by the head-up display using the camera of the setting device; and determining setting information for the head-up display on the basis of the at least one acquired test image.

According to a further disclosed embodiment, a computer-readable storage medium contains instructions that, when executed by a computer, prompt the computer to execute the following operations for setting a head-up display in a transportation vehicle introducing a setting device into a defined position in the transportation vehicle, wherein the setting device has at least one camera and one projection unit; projecting an alignment pattern using the projection unit onto a calibration target positioned outside the transportation vehicle; acquiring the calibration target and the alignment pattern using a calibrated camera installed in the transportation vehicle; determining a deviation of the setting device from the defined position in the transportation vehicle on the basis of the image data of the calibrated camera; acquiring at least one test image displayed by the head-up display using the camera of the setting device; and determining setting information for the head-up display on the basis of the at least one acquired test image.

The term computer should in this case be understood broadly. It also comprises workstations, controllers and other processor-based data processing devices.

According to a further disclosed embodiment, a device for setting a head-up display in a transportation vehicle has a control unit for introducing a setting device into a defined position in the transportation vehicle, wherein the setting device has at least one camera and one projection unit, and for projecting an alignment pattern using the projection unit onto a calibration target positioned outside the transportation vehicle; and a computer unit for acquiring the calibration target and the alignment pattern using a calibrated camera installed in the transportation vehicle, for determining a deviation of the setting device from the defined position in the transportation vehicle on the basis of the image data of the calibrated camera, for acquiring at least one test image displayed by the head-up display using the camera of the setting device, and for determining setting information for the head-up display on the basis of the at least one acquired test image.

According to a further disclosed embodiment, a setting device for use in a disclosed method or with a disclosed device has a projection unit for projecting an alignment pattern onto a calibration target positioned outside the transportation vehicle; a camera for acquiring at least one test image displayed by the head-up display; and a holder for fastening the setting device in a defined position in the transportation vehicle.

The solution according to the disclosure is based on the concept of realizing the alignment of the camera that records the test images on the basis of a multifunctional camera installed in the transportation vehicle. A multifunctional camera is installed in transportation vehicles with a head-up display. This acquires important driving information, such as, for example, traffic signs or roadway markings, and forwards these to the head-up display to be displayed on the windscreen. At present, a calibration target on which a pattern is imaged is used to calibrate the multifunctional camera. By way of example, the calibration target has a size of 1500 mm×2000 mm and is situated at a distance of 1 m in front of the transportation vehicle. The multifunctional camera records the pattern and calibrates itself on the basis of the recorded pattern. The calibration target is generally in the calibration position, that is to say almost as far down as the floor, when calibrating the head-up display as well, so that the brake lights of the transportation vehicle in front do not hinder the image recording of the test images.

The setting device then consists of the camera for recording the test images, a projection unit that is arranged so as to be fixed relative to the camera, and a holder on which the camera and the projection unit are installed. The adjustment and the calibration are performed in a plurality of operations. First of all, the holder is introduced into and fixed in the transportation vehicle. The position of the camera is then already roughly correct, since the holder may be constructed such that the camera is positioned close to the middle of the eyebox. The projection unit is then activated and projects an alignment pattern onto the calibration target. This alignment pattern is acquired by the multifunctional camera. The deviations from the ideal position of the alignment pattern are transmitted to the camera of the setting device or taken into account in the later evaluation of the test images. The ideal position is in this case determined, for example, in the context of the development in the simulated transportation vehicle and stored in the multifunctional camera. Since the multifunctional camera has already been calibrated beforehand, it is able to determine the deviations of the alignment pattern from the ideal position.

If an installation tolerance of the multifunctional camera of a yaw angle of 1° (left to right) was determined by calibrating the multifunctional camera and the multifunctional camera then measures the alignment pattern with a 2° yaw to the ideal position, it thus then transmits a deviation of 1° yaw angle to the camera of the setting device, taking into account the calibration results.

Based on the deviations measured by the multifunctional camera, the camera of the setting device thus has the information as to how it is positioned relative to the ideal position. This may then be taken into account in the image recording of the test images or the determination of the setting information for the head-up display.

The described solution has a number of benefits. It is reliable in terms of process due to the inherent repetition accuracy. It additionally reduces the required production time, since the positioning of the camera or of the calibration device is able to be completed more quickly. The costs are also lower than in the case of solutions that are based on a mechanically movable telescopic arm. High accuracies are at the same time achieved. The described solution is additionally able to be used consistently both in production and in customer service.

According to at least one disclosed embodiment, the setting information for the head-up display is transmitted to a controller for the head-up display. As an alternative, the head-up display is adjusted on the basis of the setting information. Using the setting information, the determined deviations may firstly be written to the controller of the head-up display, that is to say the head-up display is calibrated. This is expedient in the case of just small deviations, since an additional adjustment is able to be dispensed with. As an alternative, the position of the head-up display module may be optimized, that is to say an adjustment is performed. This is expedient in the case of relatively large deviations, since the complete display region of the head-up display is thus able to be used.

According to at least one disclosed embodiment, the projection unit has a laser. The alignment pattern is in this case may be a line. The use of a laser has the benefit that a very precisely defined alignment pattern is able to be projected, in particular, considering the distance between the projection unit and the calibration target. A line in this case constitutes an alignment pattern that is easy to generate and requires just a one-dimensional deflection of the generated laser beam.

According to at least one disclosed embodiment, the setting device is fastened to bearings of at least one sun visor of the transportation vehicle, for example, to central bearings of the sun visors, by way of a holder. This has the benefit that the setting device is able to be easily hooked up and fixed. The bearings are additionally situated at a defined position in the transportation vehicle, such that very readily reproducible positioning of the setting device is guaranteed.

According to at least one disclosed embodiment, the defined position in the transportation vehicle is the position of an eyebox of the head-up display. As the contents generated by the head-up display are intended to be visible in the region of the eyebox, it is expedient to also position the setting device or the camera of the setting device in this region.

According to at least one disclosed embodiment, the setting device has a manipulator for adjusting the head-up display, for example, a screwdriver. This has the benefit that the setting device not only determines the setting information for the head-up display, but also adjusts the head-up display module on the basis of the setting information. Although the use of automated manipulators influences the weight of the setting device, which influences the ergonomics of the operating procedure of the operator, a separate adjustment operation for this, which possibly requires a further check, is able to be dispensed with.

According to at least one disclosed embodiment, the setting device has two cameras for left-hand drive transportation vehicles and right-hand drive transportation vehicles. In addition to at least one disclosed embodiment in which the setting device is designed for either left-hand drive transportation vehicles or right-hand drive transportation vehicles, the setting device may have two cameras and possibly two projection units for left-hand drive transportation vehicles and right-hand drive transportation vehicles. In this way, the setting device is able to be used for both types of transportation vehicle, such that it is not necessary to keep different setting devices ready.

To improve understanding of the principles of the present disclosure, exemplary embodiments are explained in more detail below with reference to the figures. It is understood that the disclosure is not restricted to these disclosed embodiments and that the described features may also be combined or modified without departing from the scope of protection of the disclosure as defined.

Figure 1:
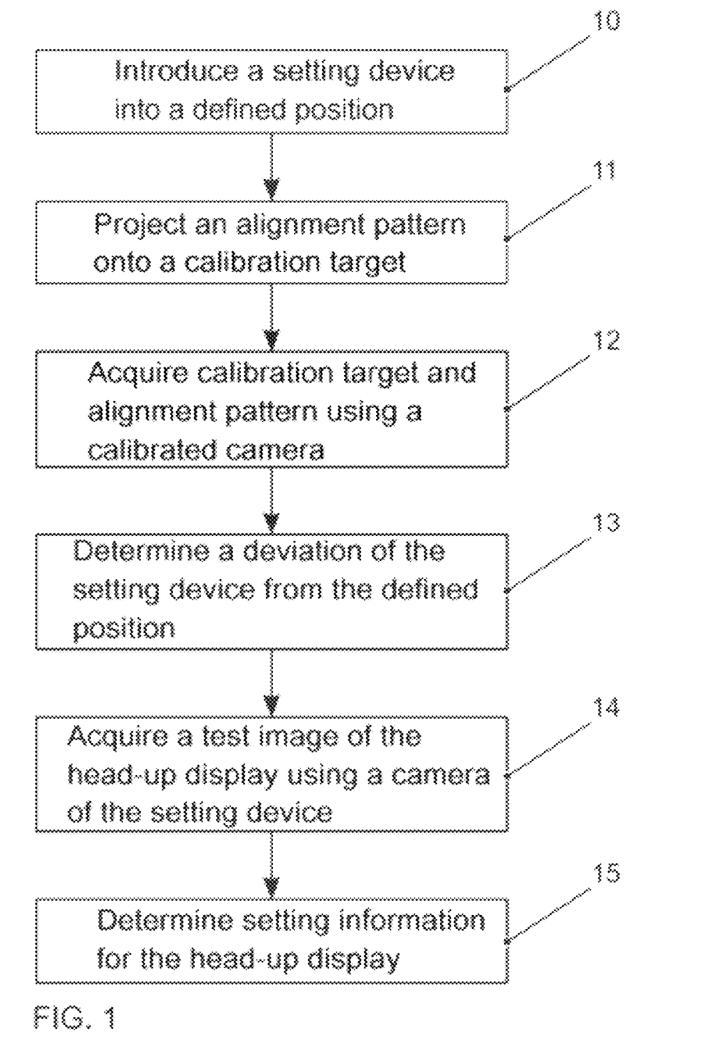
FIG. 1 schematically shows a method for setting a head-up display in a transportation vehicle.

FIG. 1 schematically shows a method for setting a head-up display in a transportation vehicle. In a first operations at 10, a setting device is introduced into a defined position in the transportation vehicle, optionally into the position of an eyebox of the head-up display. The setting device may, for example, be fastened to bearings of at least one sun visor of the transportation vehicle by way of a holder. The setting device has at least one camera and one projection unit. The projection unit is then used to project 11 an alignment pattern onto a calibration target positioned outside the transportation vehicle. The projection unit may, for example, have a laser. The alignment pattern may in this case be a line. The calibration target and the alignment pattern are acquired 12 using a calibrated camera installed in the transportation vehicle. A deviation of the setting device from the defined position in the transportation vehicle is then determined 13 on the basis of the image data of the calibrated camera. At least one test image displayed by the head-up display is then acquired 14 using the camera of the setting device. Setting information for the head-up display is lastly determined 15 on the basis of the at least one acquired test image.

Figure 2:
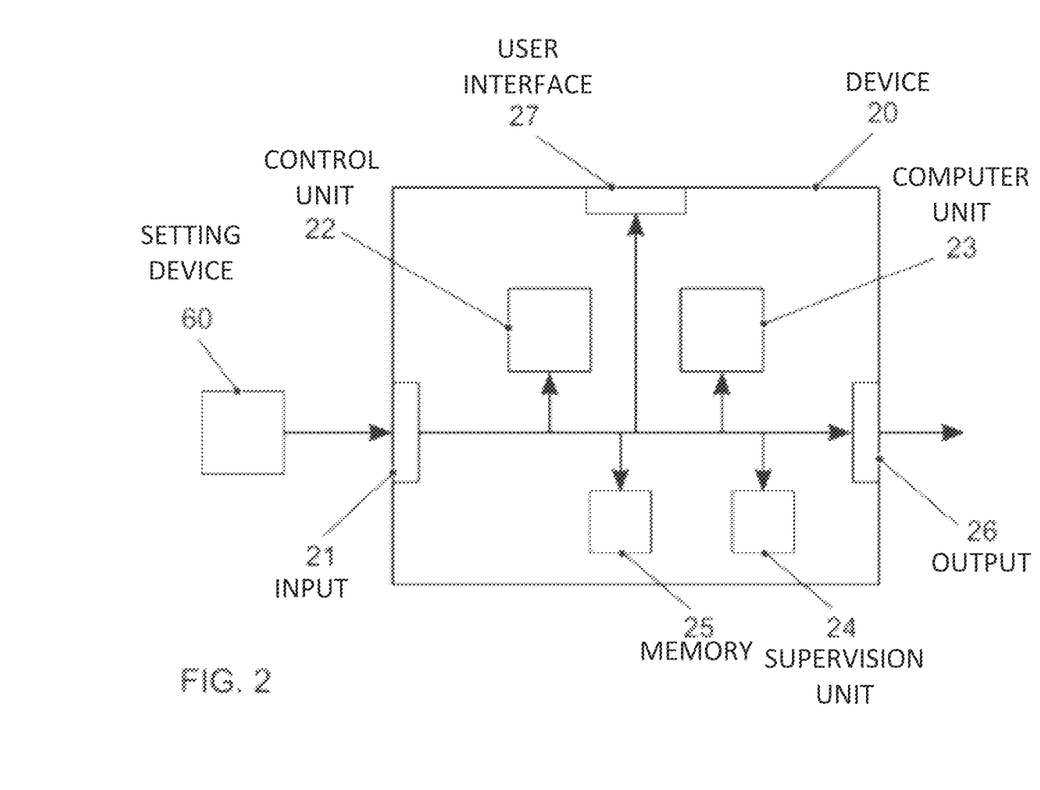
FIG. 2 shows a first embodiment of a device for setting a head-up display in a transportation vehicle.

FIG. 2 shows a simplified schematic illustration of a first disclosed embodiment of a device 20 for setting a head-up display in a transportation vehicle. The device 20 has an input 21 via which, for example, data of a setting device 60, which has at least one camera and one projection unit, are able to be received. A control unit 22 ensures that the setting device 60 is introduced into a defined position in the transportation vehicle, optionally into the position of an eyebox of the head-up display. The setting device may, for example, be fastened to bearings of at least one sun visor of the transportation vehicle by way of a holder. The control unit 22 additionally controls the projection of an alignment pattern using the projection unit onto a calibration target positioned outside the transportation vehicle. The projection unit may, for example, have a laser. The alignment pattern may in this case be a line. A computer unit 23 acquires the calibration target and the alignment pattern using a calibrated camera installed in the transportation vehicle. The computer unit 23 additionally determines a deviation of the setting device from the defined position in the transportation vehicle on the basis of the image data of the calibrated camera. The computer unit 23 likewise acquires at least one test image displayed by the head-up display using the camera of the setting device 60 and determines setting information for the head-up display on the basis of the at least one acquired test image. Of course, separate units may also be provided for the various functions of the computer unit 23. The setting information is output to a controller for the head-up display or provided for adjustment of the head-up display via an output 26 of the device 20.

The control unit 22 and the computer unit 23 may be controlled by a supervision unit 24. Settings of the control unit 22, of the computer unit 23 or of the supervision unit 24 may likewise be changed via a user interface 27. The data arising in the device 20 may be stored where required in a memory 25 of the device 20, for example, for later evaluation or for use by the components of the device 20. The control unit 22, the computer unit 23 and the supervision unit 24 may be implemented as dedicated hardware, for example, as integrated circuits. They may of course however also be implemented in partly or fully combined form or as software that runs on a suitable processor, for example, on a GPU or a CPU. The input 21 and the output 26 may be implemented as separate interfaces or as a combined bidirectional interface. In the described example, the device 20 is a standalone component. It may however likewise be integrated in the setting device 60.

Figure 3:
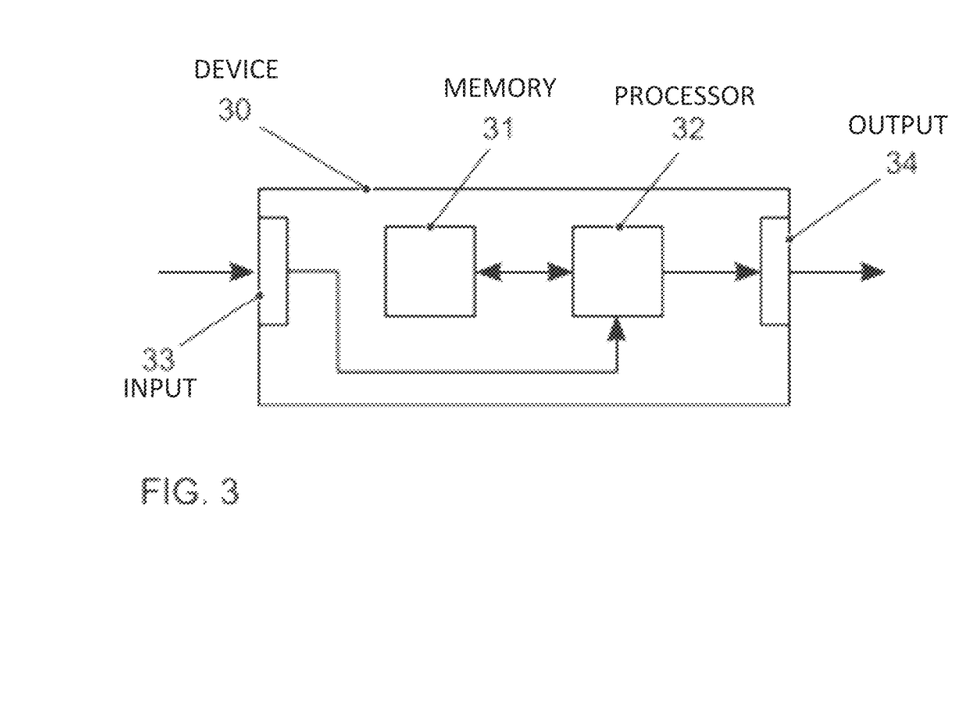
FIG. 3 shows a second embodiment of a device for setting a head-up display in a transportation vehicle.

FIG. 3 shows a simplified schematic illustration of a second disclosed embodiment of a device 30 for setting a head-up display in a transportation vehicle. The device 30 has a processor 32 and a memory 31. The device 30 is, for example, a computer or a controller. The memory 31 stores instructions that, when executed by the processor 32, prompt the device 30 to execute the operations according to one of the described methods. The instructions stored in the memory 31 thus embody a program able to be executed by the processor 32 and that implements the disclosed method. The device 30 has an input 33 for receiving information, for example, data of a setting device. Data generated by the processor 32 are provided via an output 34. They may furthermore be stored in the memory 31. The input 33 and the output 34 may be combined to form a bidirectional interface.

The processor 32 may comprise one or more processor units, for example, microprocessors, digital signal processors or combinations thereof.

The memories 25, 31 of the described embodiments may have both volatile and non-volatile memory areas and comprise a wide variety of storage devices and storage media, for example, hard disk drives, optical storage media or semiconductor memories.

Figure 4:
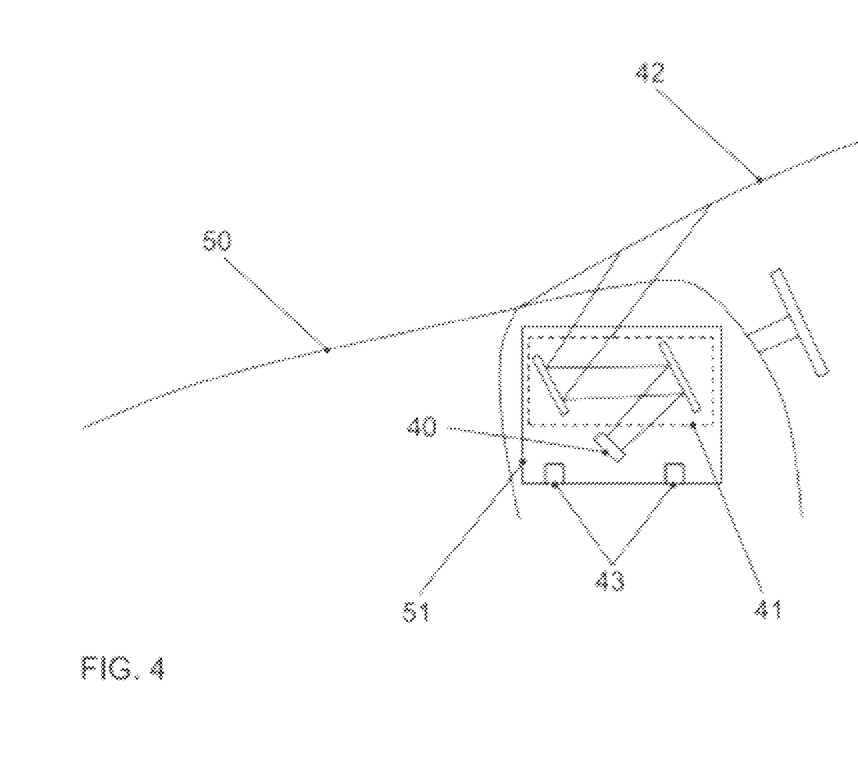
FIG. 4 schematically shows a general structure of a head-up display device for a transportation vehicle.

FIG. 4 schematically shows a head-up display 51 for a transportation vehicle 50. Using the head-up display 51, it is possible to display contents on a projection surface 42 of the transportation vehicle 50, for example, on the front windscreen. The displayed contents are generated by an imaging unit 40 and projected onto the projection surface 42 using an optical module 41. The projection is typically performed in this case into a region of the front windscreen above the steering wheel. The imaging unit 40 may be, for example, an LCD-TFT display. The head-up display 51 is generally installed in a dashboard of the transportation vehicle 50. The position of the head-up display 51 is able to be adjusted by way of setting elements 43.

Figure 5:
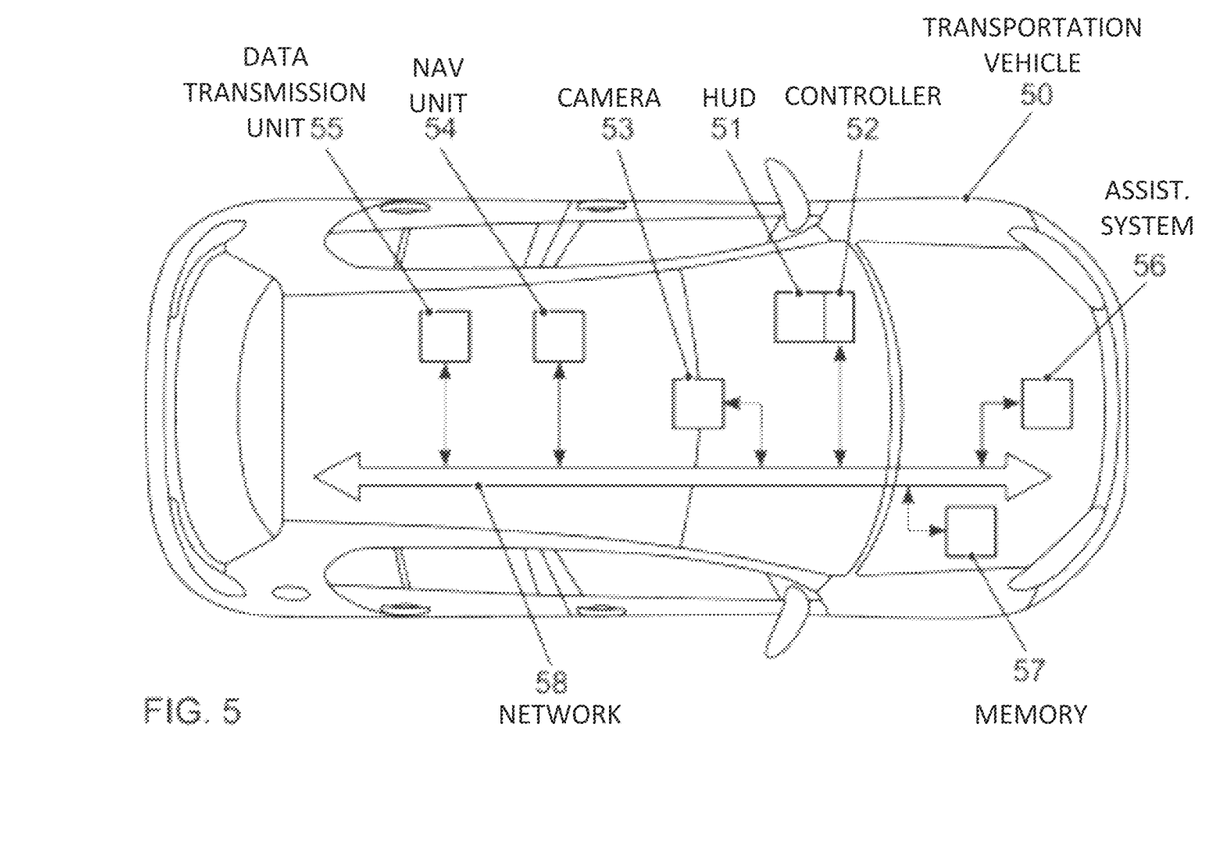
FIG. 5 schematically illustrates a transportation vehicle with a head-up display device.

FIG. 5 schematically illustrates a transportation vehicle 50 with a head-up display 51. The head-up display 51 is controlled by an associated controller 52. Further components of the transportation vehicle 50 are a camera 53 for monitoring the surroundings, a navigation system 54, a data transmission unit 55 and a number of assistance systems 56, one of which is shown by way of example. A connection to service providers is able to be established, for example, to retrieve map data, by way of the data transmission unit 55. A memory 57 is present to store data. The exchange of data between the various components of the transportation vehicle 50 takes place via a network 58.

Figure 6:
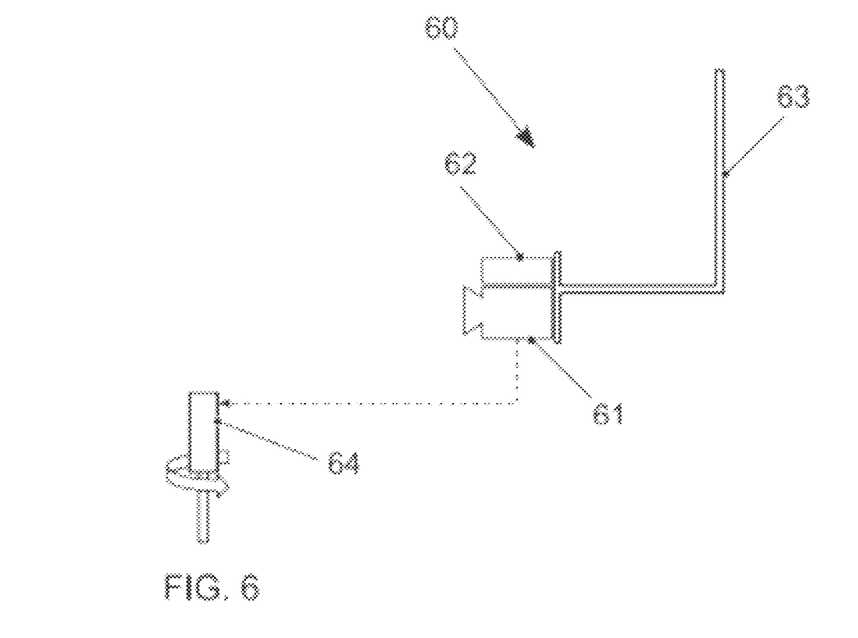
FIG. 6 schematically shows a setting device.

FIG. 6 schematically shows a setting device 60 for use in the method from FIG. 1 or with the device from FIG. 2 or FIG. 3. The setting device 60 has a projection unit 62 for projecting an alignment pattern onto a calibration target positioned outside a transportation vehicle. The projection unit 62 may, for example, have a laser. The alignment pattern may in this case be a line. A camera 61 serves to acquire at least one test image generated by a head-up display of the transportation vehicle. The setting device 60 may be fastened in a defined position in the transportation vehicle by way of a holder 63. At least one manipulator 64, for example, a screwdriver by way of which the head-up display is able to be adjusted, is optionally provided. This may be fastened to the setting device 60 or else just be driven by the setting device 60. In at least one disclosed embodiment, the setting device 60 may have two cameras 61 for left-hand drive transportation vehicles and right-hand drive transportation vehicles. In this case, two projection units 62 may also be provided.

Figure 7:
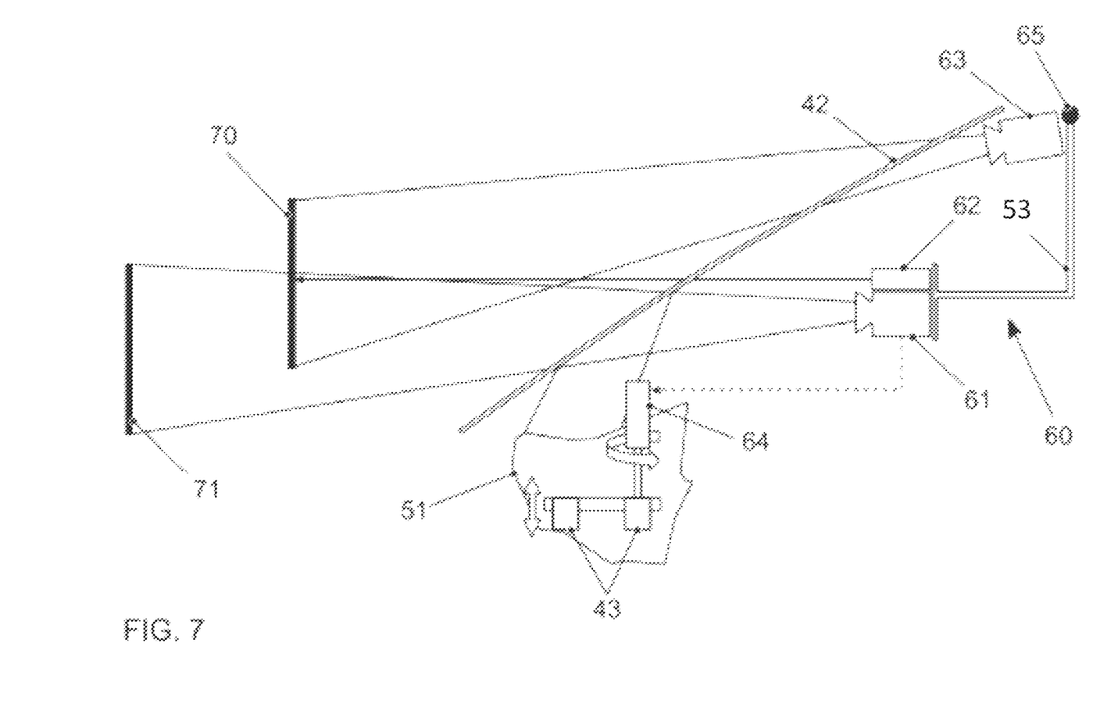
FIG. 7 schematically shows the use of the setting device from FIG. 6 for setting a head-up display in a transportation vehicle.

FIG. 7 schematically shows the use of the setting device 60 from FIG. 6 for setting a head-up display 51 in a transportation vehicle. The operator moving the transportation vehicle on the testing bay positions the setting device 60 on bearings 65 of the sun visors, for example, on the central bearings. He then starts the setting procedure. This may be realized both on the facility and by a serial inspection system. The cameras 53, 61 and the projection unit 62 and the display of the test images are then controlled automatically by the facility or the serial inspection system.

The projection unit 62 has a laser in the example of FIG. 7. The camera 61 of the setting device 60 and the laser are aligned optimally with one another beforehand in an alignment process. The laser then projects a line onto a calibration target 70 that is situated in front of the transportation vehicle.

A previously calibrated multifunctional camera 53 of the transportation vehicle determines the rotational deviations of the projected line about all axes to the setpoint line in the case of an ideally positioned holder 63 of the setting device 60. A shift of the laser line along the Y-axis (left to right) in this case means a rotation of the holder 63 about the vertical axis (Z-axis). A shift of the laser line along the Z-axis (top to bottom) means a rotation of the holder 63 about the horizontal axis (Y-axis). A rotation of the laser line clockwise or anticlockwise means a rotation of the holder 63 about the transportation vehicle longitudinal axis (X-axis). Since the laser and the calibration camera 61 are aligned with one another, the viewing direction of the calibration camera 61 is then known, and the camera 61 is ready for use for the calibration.

The camera 61 then determines the deviation of the virtual image 71 generated by the head-up display 51 using the projection surface 42, that is to say the windscreen pane, from the setpoint position in the case of an ideally installed head-up display module, taking into account the deviations determined by the multifunctional camera 53. The setting information determined from these deviations may then be written to the controller of the head-up display 51 and taken into account in the display. As an alternative, manipulators 64, which change the head-up display module in terms of its position by way of the setting elements 43 such that the image is set to a zero position, may be driven automatically. As a further alternative, it is possible to output instructions as to by how many rotations and in which direction of rotation the setting elements have to be moved to set the image to the zero position. Guided adjustment is thus performed. After the setting procedure has ended, the operator removes the setting device 60 from the transportation vehicle before driving out of the testing bay and then moves the transportation vehicle out of the testing bay.

The guided adjustment described above may also be performed by a customer service department when setting the head-up display 51.

LIST OF REFERENCE SIGNS

- 10 Introduce a setting device into a defined position
- 11 Project an alignment pattern onto a calibration target
- 12 Acquire calibration target and alignment pattern using a calibrated camera
- 13 Determine a deviation of the setting device from the defined position
- 14 Acquire a test image of the head-up display using a camera of the setting device
- 15 Determine setting information for the head-up display
- 20 Device
- 21 Input
- 22 Control unit
- 23 Computer unit
- 24 Supervision unit
- 25 Memory
- 26 Output
- 27 User interface
- 30 Device
- 31 Memory
- 32 Processor
- 33 Input
- 34 Output
- 40 Imaging unit
- 41 Optical module
- 42 Projection surface
- 43 Setting element
- 50 Transportation vehicle
- 51 Head-up display
- 52 Controller
- 53 Camera
- 54 Navigation system
- 55 Data transmission unit
- 56 Assistance system
- 57 Memory
- 58 Network
- 60 Setting device
- 61 Camera
- 62 Projection unit
- 63 Holder
- 64 Manipulator
- 65 Bearing
- 70 Calibration target
- 71 Virtual image

The invention claimed is:

1. A device for setting a head-up display in a transportation vehicle, the device comprising:
   a control unit for introducing a setting device into a defined position in the transportation vehicle, wherein the setting device has at least one camera and a projection unit, wherein the control unit controls projecting an alignment pattern using the projection unit onto a calibration target positioned outside the transportation vehicle; and
   a computer unit for acquiring the calibration target and the alignment pattern using a calibrated camera installed in the transportation vehicle, wherein the computer unit determines a deviation of the setting device from the defined position in the transportation vehicle based on the image data of the calibrated camera, acquires at least one test image displayed by the head-up display using the at least one camera of the setting device, and determines setting information for the head-up display based on the at least one acquired test image.

2. The device of claim 1, further comprising a manipulator for adjusting the head-up display.

3. The device of claim 1, wherein the at least one camera of the setting device comprises two cameras including one for left-hand drive transportation vehicles and one for right-hand drive transportation vehicles.

4. The device of claim 1, wherein the setting information for the head-up display is transmitted to the control unit for the head-up display or the head-up display is adjusted based on the setting information.

5. The device of claim 1, wherein the projection unit has a laser and the alignment pattern is a line.

6. The device of claim 1, wherein the setting device is fastened to bearings of at least one sun visor of the transportation vehicle by a holder.

7. The device of claim 1, wherein the defined position in the transportation vehicle is the position of an eyebox of the head-up display.

8. A setting device for use in setting a head-up display in a transportation vehicle, the setting device comprising:
   a projection unit for projecting an alignment pattern onto a calibration target positioned outside the transportation vehicle;
   a setting device camera for acquiring at least one test image displayed by the head-up display; and
   a holder for fastening the setting device in a defined position in the transportation vehicle,
   wherein the setting device is introduced into a defined position in the transportation vehicle, wherein image data of the calibration target and the alignment pattern are acquired using a calibrated camera, a deviation of the setting device from the defined position in the transportation vehicle is determined based on the acquired image data, and wherein setting information for the head-up display is determined based on the at least one acquired test image.

9. The setting device of claim 8, further comprising a manipulator for adjusting the head-up display.

10. The setting device of claim 8, wherein the setting device camera comprises two cameras including one for left-hand drive transportation vehicles and one for right-hand drive transportation vehicles.

11. The setting device of claim 8, wherein the setting information for the head-up display is transmitted to the control unit for the head-up display or the head-up display is adjusted based on the setting information.

12. The setting device of claim 8, wherein the projection unit has a laser and the alignment pattern is a line.

13. The setting device of claim 8, wherein the setting device is fastened to bearings of at least one sun visor of the transportation vehicle by a holder.

14. The setting device of claim 8, wherein the defined position in the transportation vehicle is the position of an eyebox of the head-up display.

15. A method for setting a head-up display in a transportation vehicle, the method comprising:
   introducing a setting device into a defined position in the transportation vehicle, wherein the setting device has at least one camera and one projection unit;
   projecting an alignment pattern using the projection unit onto a calibration target positioned outside the transportation vehicle;
   acquiring the calibration target and the alignment pattern using a calibrated camera installed in the transportation vehicle;
   determining a deviation of the setting device from the defined position in the transportation vehicle based on the image data of the calibrated camera;
   acquiring at least one test image displayed by the head-up display using the at least one camera of the setting device; and
   determining setting information for the head-up display based on the at least one acquired test image.

16. The method of claim 15, wherein the setting information for the head-up display is transmitted to a controller for the head-up display or the head-up display is adjusted based on the setting information.

17. The method of claim 15, wherein the projection unit has a laser and the alignment pattern is a line.

18. The method of claim 15, wherein the setting device is fastened to bearings of at least one sun visor of the transportation vehicle by a holder.

19. The method of claim 15, wherein the defined position in the transportation vehicle is the position of an eyebox of the head-up display.

20. A non-transitory computer-readable storage medium containing instructions that, when executed by a computer, prompt the computer to execute a method for setting a head-up display in a transportation vehicle, the method comprising:
   introducing a setting device into a defined position in the transportation vehicle, wherein the setting device has at least one camera and one projection unit;
   projecting an alignment pattern using the projection unit onto a calibration target positioned outside the transportation vehicle;
   acquiring the calibration target and the alignment pattern using a calibrated camera installed in the transportation vehicle;
   determining a deviation of the setting device from the defined position in the transportation vehicle based on the image data of the calibrated camera;
   acquiring at least one test image displayed by the head-up display using the at least one camera of the setting device; and
   determining setting information for the head-up display based on the at least one acquired test image.

* * * * *